United States Patent [19]

Leslie

[11] Patent Number: 4,971,647
[45] Date of Patent: Nov. 20, 1990

[54] METHOD OF AUTOMATED ASSEMBLY OF A HARNESS RETAINER STUD

[75] Inventor: Michael D. Leslie, Warren, Mich.

[73] Assignee: Chrysler Corporation, Highland Park, Mich.

[21] Appl. No.: 327,215

[22] Filed: Mar. 22, 1989

Related U.S. Application Data

[62] Division of Ser. No. 116,939, Nov. 5, 1987, Pat. No. 4,853,075.

[51] Int. Cl.⁵ .................. B32B 31/00; B21P 19/00; B25C 11/00
[52] U.S. Cl. .................. 156/249; 156/344; 156/542; 156/584; 29/426.3; 227/63; 411/512
[58] Field of Search .............. 156/230, 235, 238, 247, 156/249, 285, 344, 361, 540, 541, 542, 580, 584; 29/235, 426.6, 426.1, 426.2, 426.3, 426.4, 426.5, 423, 413, 791; 225/23, 24, 81; 227/63; 100/180, 183, 184; 411/82, 512, 256; 428/40, 347

[56] References Cited

U.S. PATENT DOCUMENTS

| | | | |
|---|---|---|---|
| 2,857,754 | 10/1958 | Reinert . | |
| 3,406,441 | 10/1968 | Larsson | 29/235 |
| 3,947,945 | 4/1976 | Gulistan | 29/235 |
| 3,950,580 | 4/1976 | Boudet | 156/249 |
| 4,093,493 | 6/1978 | Welch et al. | 156/361 |
| 4,210,484 | 7/1980 | Crankshaw et al. | 156/542 |
| 4,250,596 | 2/1981 | Hara et al. | 428/347 |
| 4,255,220 | 2/1981 | Kucheck | 156/285 |
| 4,302,492 | 11/1981 | Hutter, III | 156/247 |
| 4,306,344 | 12/1981 | Floss | 29/235 |
| 4,338,151 | 7/1982 | Hutter, III | 428/40 |
| 4,390,576 | 6/1983 | Hutter, III | 428/40 |
| 4,421,288 | 12/1983 | Blaszkowski . | |
| 4,433,930 | 2/1984 | Cosenza | 411/82 |
| 4,518,297 | 5/1985 | Kraus | 411/512 |
| 4,551,897 | 11/1985 | Holt | 29/235 |
| 4,657,460 | 4/1987 | Bien . | |
| 4,668,546 | 5/1987 | Hutter, III | 428/40 |
| 4,715,110 | 12/1987 | St. Angelo et al. | 29/235 |

FOREIGN PATENT DOCUMENTS 701599 1/1965 Canada .................. 411/250
2225333 10/1987 Japan .

Primary Examiner—John J. Gallagher
Assistant Examiner—Louis Falasco
Attorney, Agent, or Firm—Mark P. Calcaterra

[57] ABSTRACT

The present invention relates to a wire harness retainer stud adhesively bonded to an automobile body panel. This stud is used to mount a wire harness to automobile body panels. The stud contains a contact adhesive and an uncured adhesive. The contact adhesive is used to mount the stud to the body panel until the stud and panel are heated to cure the uncured adhesive, thereby bonding the stud to the panel. A method of, and apparatus for, automated assembly of the stud is also disclosed.

1 Claim, 5 Drawing Sheets

METHOD OF AUTOMATED ASSEMBLY OF A HARNESS RETAINER STUD

RELATED APPLICATIONS

This application is a division of Ser. No. 07/116,939 filed Nov. 5, 1987, now U.S. Pat. No. 4,853,075.

BACKGROUND OF THE INVENTION

1. Field of the Invention

The subject harness retainer stud is used generally to retain wire harness of conduit to an automobile body panels.

2. Description of the Related Art

Examples of similar retainer studs are found in the prior art and are best described by referring to the following patents owned by the Click Bond Company, which is a division of Physical Systems, Inc., U.S. Pat. Nos. 4,302,492, 4,338,151, 4,390,576 and 4,668,546.

These references generally describe a method and apparatus for adhesively attaching self-fixturing studs or other elements to a surface (support 36 in the '493 patent). The stud is mounted upon a support member which is movable between two positions. After an adhesive is applied to the stud, the support member is temporarily mounted to the surface with the stud in a first position that is out-of-bearing engagement with the surface. The support member is then moved to a second position to place the stud in bearing engagement with the surface, and a force is applied to the stud, urging it toward the surface. The support member is removed and discarded after the stud has bonded to the surface.

U.S. Pat. No. 4,660,546 discloses a method for rapid installation of support stud members through the use of automated or semi-automated power tool equipment. This requires a plurality of support members interconnected to each other by a breakaway runner, item number 60 in FIG. 11 of the '546 patent. The automated equipment then applied the adhesive to the stud and uses a punch-press to install the support members on the surface and to press the stud into bearing engagement with the surface. The surface is carried past the installation machinery by a conveyor.

The prior art studs contain three deficiencies which are overcome by the present invention. First, these studs require the application of adhesive at the point of assembly. Secondly, the prior art studs require the application of pressure during the adhesive bonding stage. This requires the additional structure of the support member. Thirdly, once the adhesive has bonded, an additional step of removing the disposable support member is required. The manner in which the subject invention overcomes these deficiencies is described below.

The installation method disclosed in the prior art requires that the surface, onto which the stud is mounted, be moved past the punch-press. This limits the usefulness of the installation method. As will be described below, the present invention allows the stud to be moved to a location remote from where the stud is fed into the automation equipment. This allows the stud to be mounted onto interior surfaces of automobile body panels which cannot be accessed by the punch-press used in the prior art.

These four prior art patents are hereby expressly incorporated into this description by reference.

SUMMARY OF THE INVENTION

The subject retainer stud in the preferred embodiment is envisioned to be used to mount wire harnesses to conduits in automobiles and is designed to accept a stud mountable wire harness or conduit retainer clip. Both the retainer stud and the retainer clip are universal, i.e., both may be used in a variety of environments for a variety of retention purposes and the application should not be viewed as restricted merely to wire harness or conduits.

The retainer stud comprises a threaded shaft attached to one side of a flat plate. Mounted to the opposite side of the plate is a resilient annular seal, the outer surface of which is covered with a secondary contact adhesive. A primary uncured adhesive is located in the center cavity of the annular seal. The stud is held onto an automobile body panel by the secondary adhesive. The stud and panel are then heated in a paint drying oven to cure the primary adhesive, thereby bonding the stud to the body panel.

This invention improves on the prior art by eliminating the three deficiencies noted above. First, the adhesive application at the point of assembly is avoided by making the primary adhesive a part of the stud. Secondary, pressure as applied by the support member in the prior art is not required during the adhesive bonding stage, thereby eliminating the need for the support member. Thirdly, without the support member, there is no added step required to remove the support member after the adhesive has cured.

In addition to eliminating the above deficiencies, the subject invention can be used with an automated assembly process.

This application is one of two applications filed on the same date, both commonly assigned and having similar specification and drawings. One application is entitled Harness Retainer Stud and the other is entitled Apparatus for an Method of Assembly of a Harness Retainer Stud.

DESCRIPTION OF THE DRAWINGS

Other objects, features, and advantages of the present invention will become more fully apparent from the following detailed description of the preferred embodiment, the appended claims, and the accompanying drawings in which:

DETAILED DESCRIPTION OF THE PREFERRED EMBODIMENT

Figure 1:
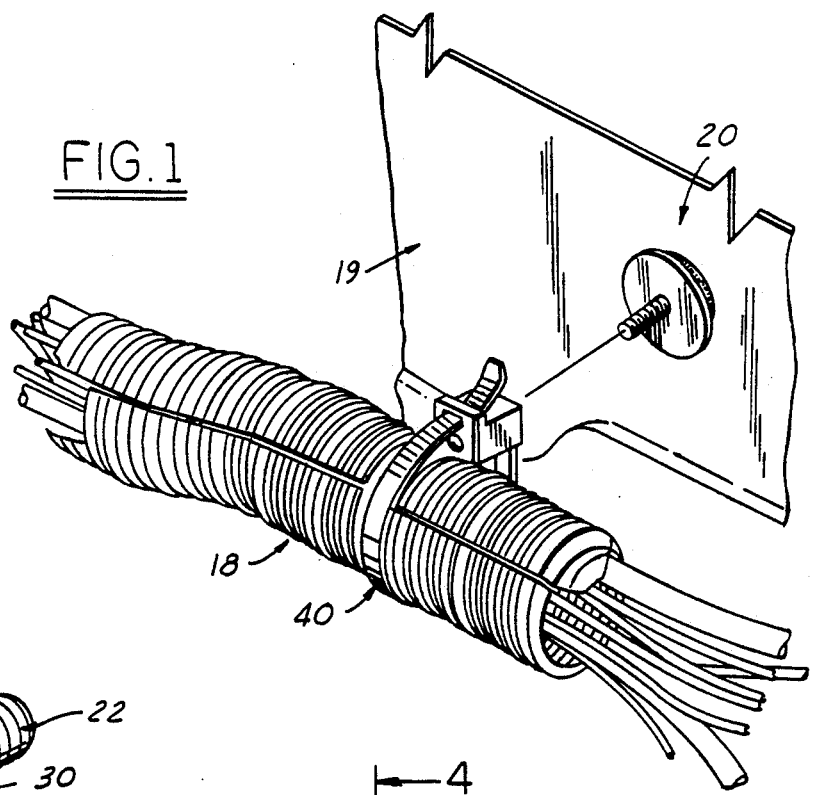
FIG. 1 is a perspective view of the installed harness retainer stud and universal harness retainer clip containing the wire harness in the assembly process.

Referring now to FIG. 1, the figure shows the harness retainer stud 20 installed on a vehicle surface 19 along with the universal harness retainer clip 40 as it holds the wire harness 18, ready for installation onto harness retainer stud 20.

Figure 2:
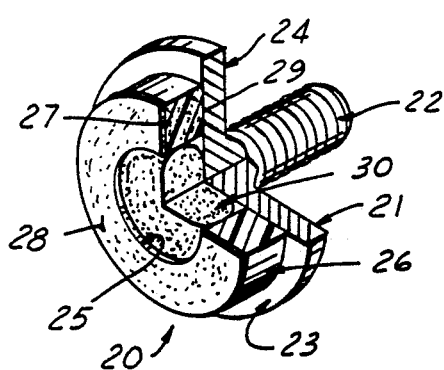
FIG. 2 is a perspective view of the harness retainer stud.
Figure 3:
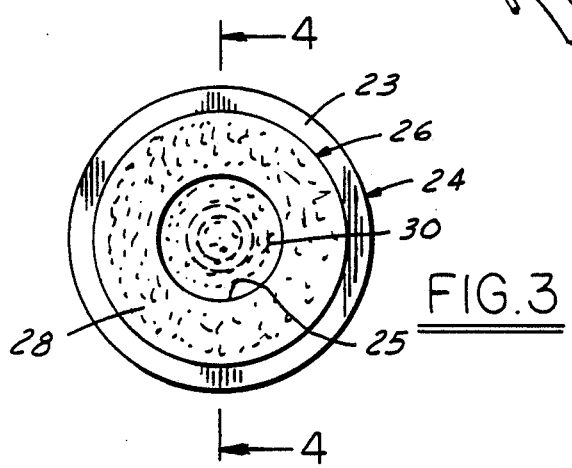
FIG. 3 is the bottom view of the harness retainer stud shown in FIG. 2.
Figure 4:
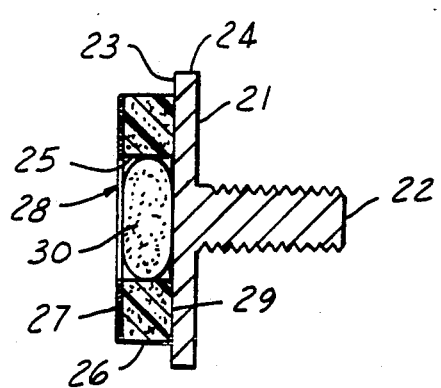
FIG. 4 is a sectional view through the section lines 4—4 of FIG. 3.

FIG. 2, FIG. 3 and FIG. 4 show harness retainer stud 20. Stud 20 is composed of several pieces. Circular plate 24 has two parallel faces, shaft face 21 and a seal face 23. Disposed upon shaft face 21 is shaft 22. Shaft 22 contains means for engaging with clip 40. These engagement means can be one or more notches, grooves, or threads as shown in the drawings.

Attached to the seal face 23 of plate 24 is a resilient annular seal 26. Seal 26 has two parallel surfaces, plate surface 29 and adhesive surface 27. Plate surface 29 is attached to the seal face 23 of plate 24. A contact adhesive 28 coats the adhesive surface 27 of seal 26. A central cavity 25 is formed by annular seal 26.

Inserted into the cavity 25 is an uncured adhesive 30. The uncured primary adhesive is a vinyl plastisol sealer such as Thiemite #11-3380 from Thiem Corporation and suitable for application to electrocoated metal surfaces.

Figure 5:
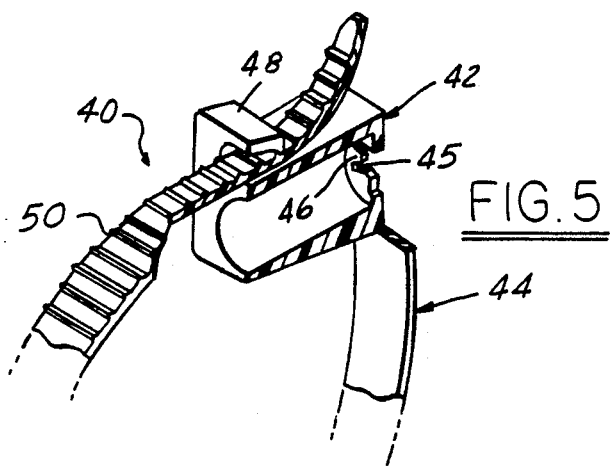
FIG. 5 is a perspective view illustrating the universal harness retainer clip according to the preferred embodiment.
Figure 6:
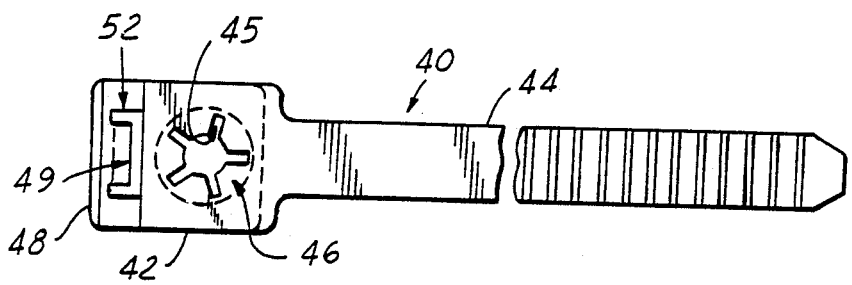
FIG. 6 is a top view of the universal harness retainer clip.
Figure 7:
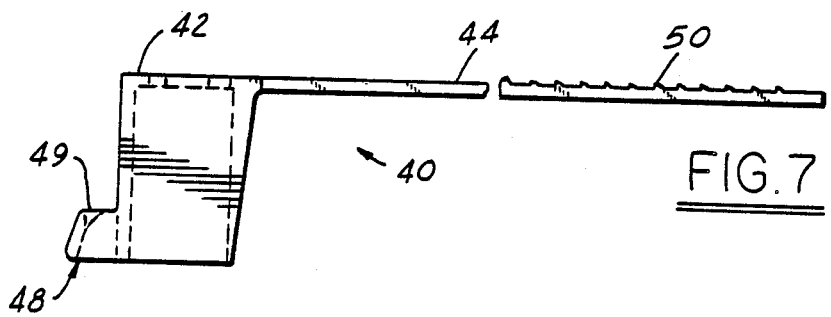
FIG. 7 is a sectional view of the universal harness retainer clip.

Referring to FIG. 5, FIG. 6 and FIG. 7, the universal harness retainer clip 40 is illustrated. The harness retainer clip 40 is molded of one piece plastic or other suitable material well know in the art. In its preferred embodiment, the universal harness retainer clip 40 contains several portions.

The retainer clip 40 comprises a hollow stud mount 42 open at one end with an aperture 45 at the other end formed by a plurality of radially inwardly disposed retention ears 46. When mounted onto the stud 20, the retention ears 46 engage the engagement means of shaft 22 in a locking arrangement to secure the clip 40 onto stud 20.

A retaining strap 44 is attached at one end to and coplanar with the end of stud mount 42 containing the aperture 45. The outer surface of strap 44, near its free end, contains a plurality of outwardly disposed ribs 50. Attached to stud mount 42 is a lock 48 having an opening 52 through the lock 48 for reception of strap 44 as shown in FIG. 5. The interior surface of opening 52 contains a flange 49 for engagement with ribs 50 in a locking arrangement.

As assembled and shown in FIG. 1, the retaining strap 44 is wrapped around the wire harness 18. The free end of strap 44 is inserted into the opening 52 of lock 48 such that the ribs 50 on strap 44 engage with flange 49 in a locking arrangement to retain wire harness 18 in clip 40 for mounting onto harness retainer stud 20 attached to vehicle surface 19.

Figure 8:
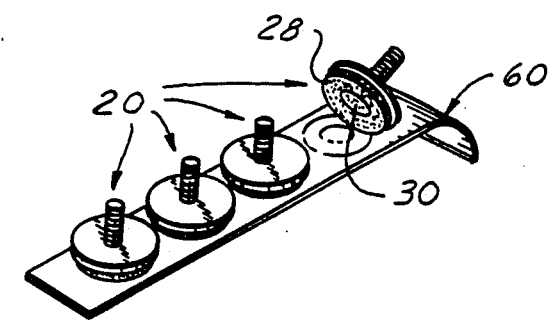
FIG. 8 is a perspective view showing one of the possible automated feed methods for the harness retainer stud.

In FIG. 8, a disposable backing strip 60 is illustrated carrying a plurality of retainer studs 20. The plurality of retainer studs 20 adhere to the disposable backing strip 60 by means of the secondary adhesive 28. An automatic assembly process would use a robot for the installation of multiple retainer studs 20 from the disposable backing strip 60. The robot would grip the shaft 22 of the stud 20, remove the stud 20 from the backing strip 60 and plate the stud at an appropriate location on the vehicle surface 19. A robot of this type is well known in the art. At this point, the uncured adhesive 30 is still uncured.

Figure 9:
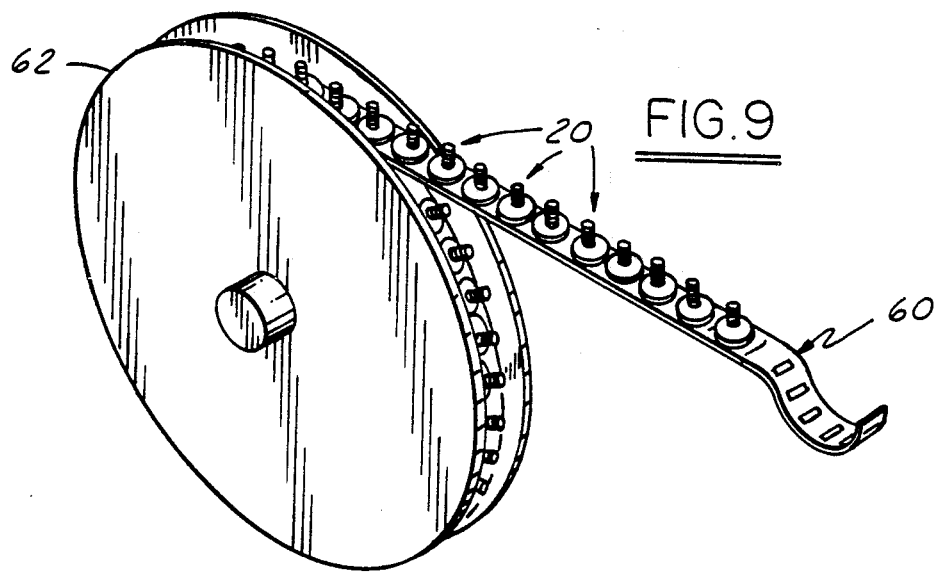
FIG. 9 is another perspective illustrating a spool-type automated feed application.

Referring now to FIG. 9, the disposable backing strip 60 is illustrated on spool 62. This perspective view illustrates multiple retainer studs 20 being adhered to the disposable backing strip 60 again by means of the secondary adhesive 28. Such a spool 62 would be used in a robotic environment to automatically feed the retainer studs 20 to the robotic arm for removal from the disposable backing 60 and location onto specific points of the vehicle surface 19.

Figure 10:
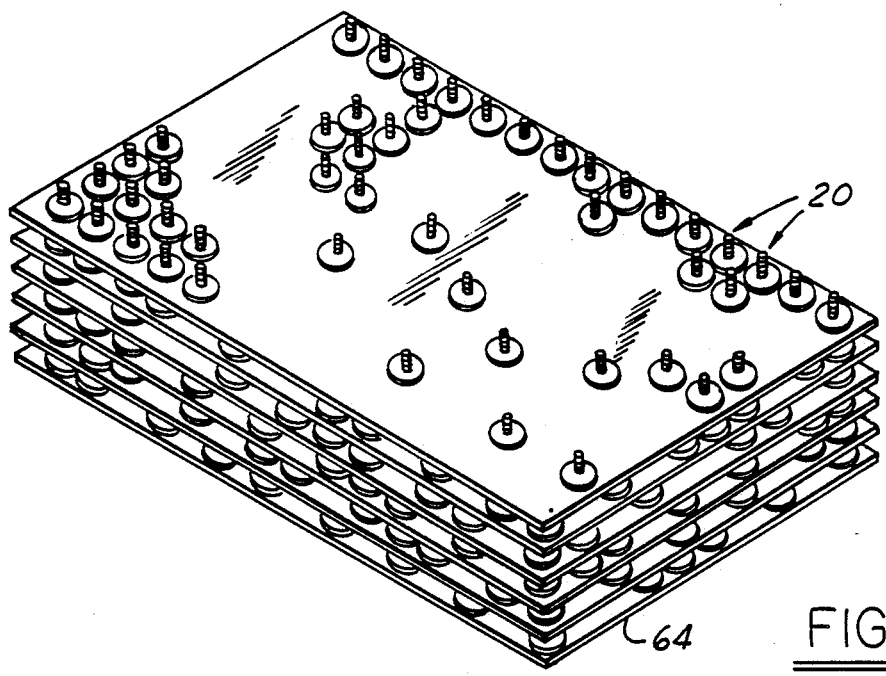
FIG. 10 is another perspective showing the harness retainer studs on a sheet backing.

Referring now to FIG. 10, another embodiment of supplying the harness retainer studs 20 for manual assembly is shown illustrating a sheet backing 64 which also interacts with the multiple harness retainer studs 20 by means of contact adhesive 28.

Not shown is another embodiment of the stud 20 with an individual circular backing paper attached to the contact adhesive 28. This paper is of the same shape and size of the annular seal 26 and is provided to protect the contact adhesive 28 until the stud 20 is mounted onto a body panel. The backing paper has an extended tab for gripping to remove the paper to expose the contact adhesive for mounting.

Figure 11:
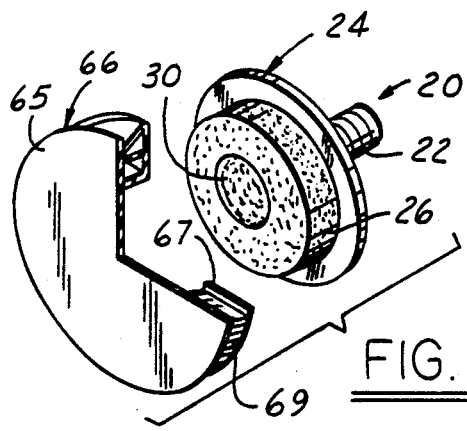
FIG. 11 is a perspective view of the harness retainer stud with separate backing.

In FIG. 11, still another method of automatically feeding the harness retainer studs 20 to an automatic installation process is illustrated which utilizes a disposable stud backing wafer 66 in interaction with the harness retainer stud 20.

Figure 12:
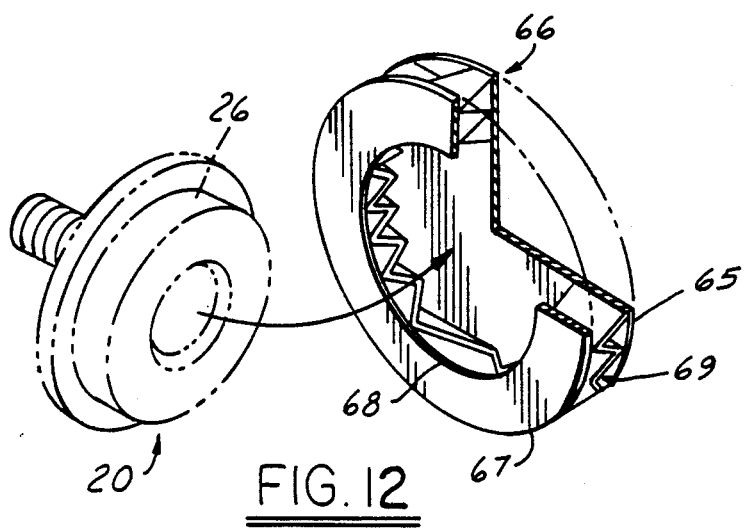
FIG. 12 is a perspective view of the harness retainer stud with separate backing.

Shown in FIG. 12 is another view of the harness retainer stud 20 with separate backing, wafer 66, this being a perspective view, highlights the retainer stud backing wafer 66.

The backing wafer 66 is made from two coplanar discs, solid disc 65 and ring disc 67 and means 69 for attaching discs 65 and 67 together. The diameter of discs 65 and 67 is larger than the diameter of plate 24 of stud 20. Ring disc 67 contains a central opening 68 exposing the interior surface 63 of solid disc 65. Opening 68 is larger than seal 26 of stud 20 such that when wafer 66 is placed on stud 20, the seal 26 contacts the interior surface 63 of solid disc 65. The wafer 66 is held onto seal 26 by contact adhesive 28.

Figure 14:
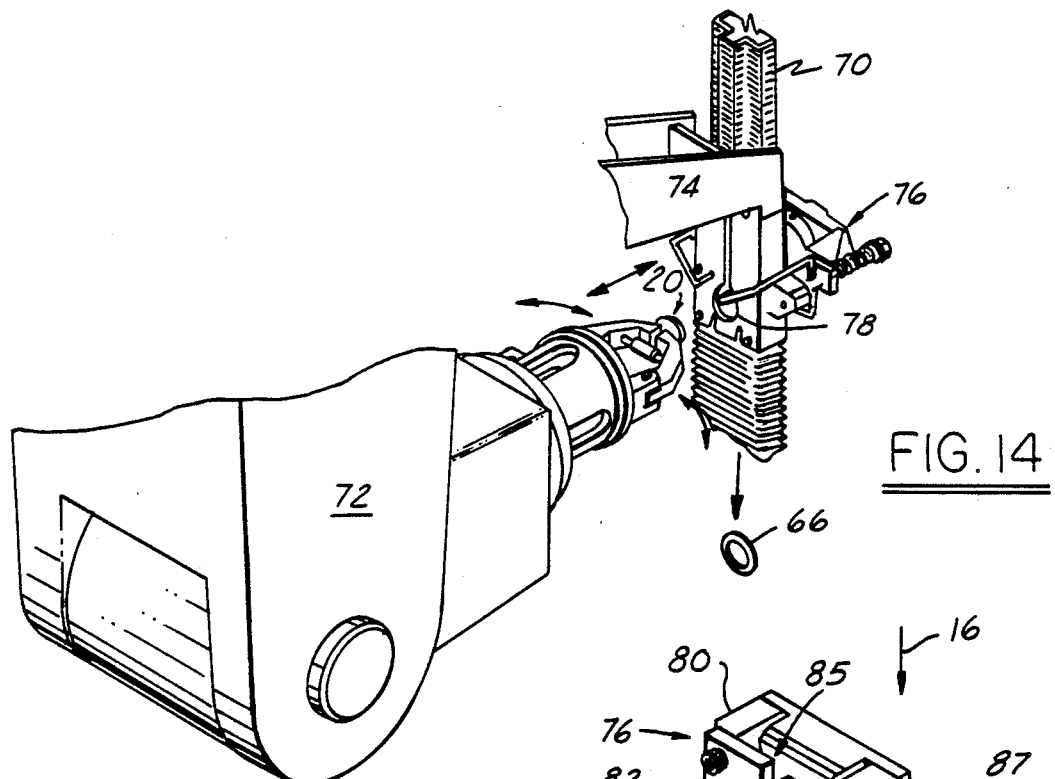
FIG. 14 is a perspective view of the stud backing removal device as developed for use with a robot installation tool and as interacting with a feeder tube which is the conduit to supply the retainer studs to the robot assembly tool.
Figure 15:
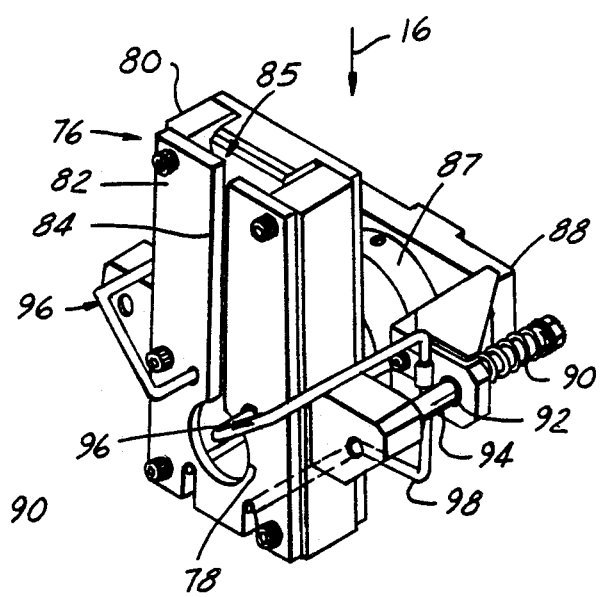
FIG. 15 is a perspective view showing the stud backing removal device.

As shown in FIG. 12, the wafer 66 is made of corrugated cardboard and is waxed to encourage easy removal of the wafer 66 from seal 26. Wafer 66 could also be made of polystyrene or other suitable material. The entire assembly comprising the harness retainer stud 20 and the disposable backing wafer 66 is designed to be fed into an assembly which would automatically align the assemblies for eventual serial alignment into a feeder tube 70 which is shown in FIG. 14 and described more fully below.

Figure 13:
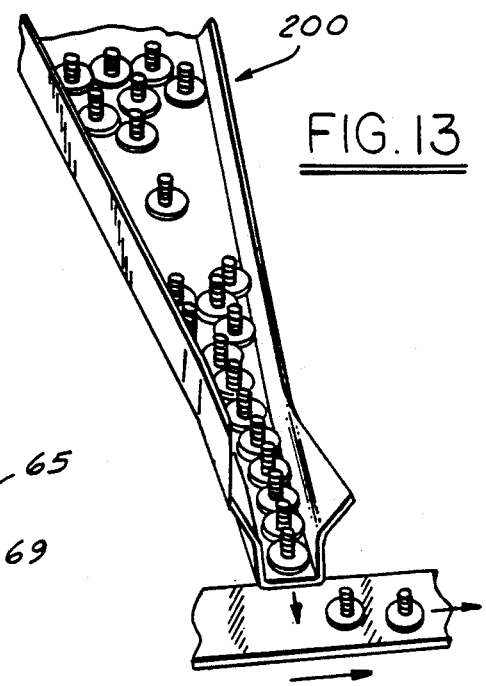
FIG. 13 is a perspective view illustrating an automated feeder assembly feature utilizing a separate backing for the harness retainer stud.

Referring now to FIG. 13, another method of feeding the harness retainer studs 20 with stud backing wafers 66 is shown using a hopper 200.

Another embodiment, not shown, eliminates the foam seal and uncured adhesive. An acrylic foam tape with removable backing available from 3M Corporation, such as 3M acrylic adhesive, number 4408, is applied to the seal face 23 of plate 24. This embodiment is appropriate for applications where less adhesive strength is required than provided by the uncured adhesive. One such application is automobile interiors where, after assembly is completed, carpeting or other components cover the wire harness and hold it in place.

The method of assembling the harness retainer stud and harness retainer clip 40 to a vehicle surface 19 is as follows. The stud 20 is gripped by the shaft 22 and removed from the backing strip 60 or sheet 64 or wafer 66 or backing paper. The stud 20 is then moved to the desired location on vehicle surface 19 and is mounted on the vehicle surface 19 by pressing the foam seal 26 onto the surface 19. This allows the stud 20 to be temporarily adhered to surface 19 by contact adhesive 28. With slight compression of seal 26, uncured adhesive 390 also contacts surface 19 and retains stud 20 on surface 19. The surface 19 and stud 20 are then heated to a sufficient temperature to cure the uncured adhesive 30 and thereby bond stud 20 to surface 19.

The above steps of gripping the stud 20, removing the backing, moving the stud 20 to surface 19, and pressing the stud 20 onto the surface 19 can be accomplished by automated equipment such as a robot. A robot of this type is well known in the art. The heating process can be accomplished in an automobile paint drying oven, also well know in the art. An automated assembly method would also include feeding the stud 20 and wafer 66 assemblies into the automation equipment. The various devices shown in FIG. 8, FIG. 9, FIG. 11, FIG. 12, and FIG. 13 can be used to feed multiple studs 20 into the automation equipment.

Referring now to FIG. 14, a perspective view is shown of the harness retainer stud 20 during and after removal from the stud backing removal device 76 by a robot arm 72. The directions of the jaws of the robot arm are illustrated in the figure by means of the arrows. Also shown by means of an arrow in the direction that the disposable wafer 66 would taken after the harness retainer stud 20 has been removed from the stud backing removal device 76 thereby allowing the wafer 66 to be retained in the device 76. The wafer 66 will either, by gravity or by the application of vacuum at the bottom of the stud backing removal device 76, be removed from the stud backing removal device 76 and be discarded. The presence of an escapement can be provided in FIG. 14, but is not shown.

Also illustrated in FIG. 14 is mounting bracket 74 which can be of many types of design, but must interact with the stud backing removal device 76 so that the stud backing removal device 76 and feeder tube 70 are retained in the appropriate position.

Referring again to the operation of the robot arm 72, when the time comes for the installation of the harness retainer stud 20 onto a vehicle, the robot arm 72 approaches the stud backing removal device 76 and grips the shaft 22, which protrudes through the opening 78 in the stud backing removal device 76. The opening 78 is designed to be smaller than the wafer 66 so that when the robot arm 72 grips the shaft 22, thereby removing the harness retainer stud 20 from the stud backing removal device 76, the wafer 66 is retained in stud backing removal device 76, allowing wafer 66 to be disposed through the bottom of the stud backing removal device 76.

Referring now to FIG. 15, FIG. 16, FIG. 17, and FIG. 18 the stud backing removal device 76 is shown. Illustrated is housing 80 which has a stud guide 82 mounted to the front of housing 80. The stud guide 82 contains a longitudinal slot 84 from the top of the stud guide 82 to an opening 78. The plate 24, foam seal 26 and wafer 66 are slid into the longitudinal passage 85 formed by housing 80 and stud guide 82. The shaft 22 of stud 20 extends outward through slot 84 of stud guide 82.

Extending rearward from housing 80 are two mount guides 94 upon which a carriage 88 is slidably mounted. Also extending rearward is a locating guide 95. Between housing 80 and carriage 88 is an air cylinder 87. Air cylinder 87 has two positions, actuated and non-actuated. In the actuated position, air cylinder 87 moves the carriage 88 rearward, away from housing 80. In the non-actuated position, springs 90 on mount guides 94 move carriage 88 forward, toward housing 80.

A pair of end stops are mounted on the locating guide 95 to define the motion limits of the carriage. In the motion limits of the carriage. In the figures, these end stops are shown as rearward positioning jam nuts 99, to locate the rearward position of carriage 88, and forward positioning jam nuts 97, to locate the forward position of carriage 88.

Attached to carriage 88 are upper 96 and lower 98 retaining nests. Lower nest 98 extends through housing 80 from the rear and into passage 85 when air cylinder 87 is in the non-actuated position. In this position, lower nest 98 retains a stud 20 and wafer 66 assembly in position in passage 85 behind opening 78 for gripping by robot 72. Other stud 20 and wafer 66 assemblies in passage 85 and feeder tube 70 are stacked upon the stud 20 and wafer 66 assembly behind opening 78.

Upper nest 96 extends around housing 80, through the front of stud guide 82 and into passage 85 when air cylinder 87 is in the actuated position. Upper nest 96 does not extend into passage 85 when air cylinder 87 is in the non-actuated position.

After the robot arm 72 has removed the stud 20 through opening 78, air cylinder 87 is actuated, moving carriage 88 rearward, away from housing 80, upper nest 96 moves into passage 85, retaining the stud 20 and wafer 66 assemblies above the now empty wafer 66 behind opening 78. At the same time, lower nest 98 retreats from passage 85, allowing the empty wafer 66 to move through passage 85 by gravity or by the application of vacuum and be discarded.

When air pressure is removed from air cylinder 87, springs 90 move carriage 88 forward, toward housing 80 to the non-actuated position. Lower nest 98 again extends into passage 85 while upper nest 96 retreats from passage 85. This allows a stud 20 and wafer 66 assembly to drop down into lower nest 98 behind opening 78 in position for gripping by robot arm 72.

Figure 16:
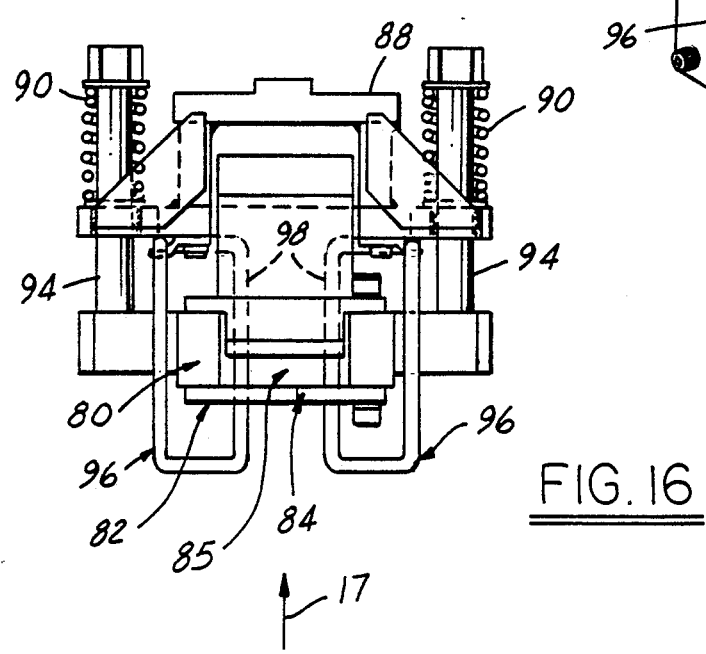
FIG. 16 is a top view of the stud backing removal device.
Figure 17:
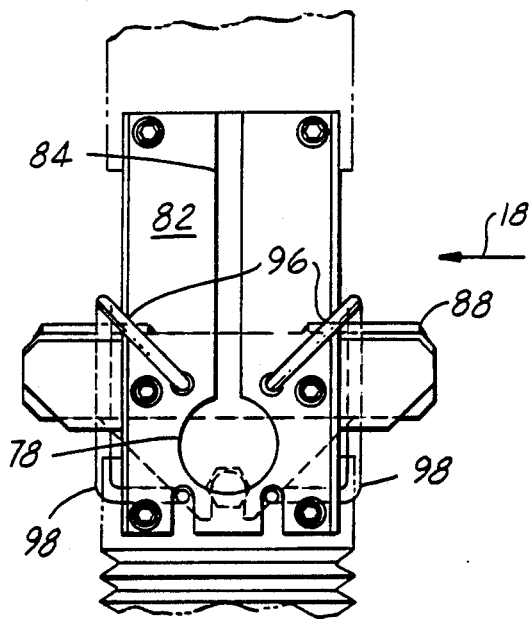
FIG. 17 is a front view of the stud backing removal device.
Figure 18:
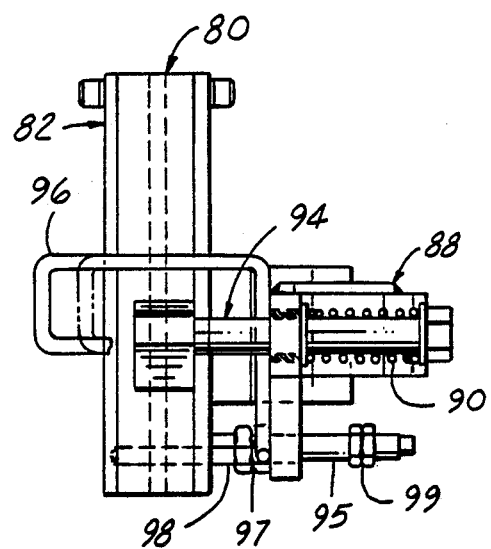
FIG. 18 is a side view of the stud backing removal device.

Further details of the above-described components are shown in the top view of the stud backing removal device shown in FIG. 16 and the front view of the stud backing removal device shown in FIG. 17, along with the side view of the stud backing removal device shown in FIG. 18.

It is understood that the invention is not limited to the exact construction and method steps illustrated and described above, but that various changes and modifications may be made without departing from the spirit and scope of the invention as defined in the following claims.

What is claimed is:

1. A method of attaching a retainer stud to a panel using automation equipment, the retainer stud having a circular flat plate having a shaft face and a seal face, the faces parallel to one another, a shaft disposed upon the shaft face of the plate having clip engaging means for communicating with a retainer clip, a resilient annular seal having a plate surface and an adhesive surface, the surfaces parallel to one another, the plate surface attached to the seal face of the plate, the annular seal having a central cavity, a contact adhesive coating on the adhesive surface of the seal for mounting the retainer stud on the panel, an uncured adhesive in the central cavity of the seal which when cured will bond the retainer stud to the panel, the retainer stud attached to a backing wafer, said method comprising the steps of:

feeding the retainer stud having a backing wafer to the automation equipment;

gripping the shaft of the retainer stud with a robot arm of the automation equipment;

removing the backing wafer from the retainer stud by movement of the robot arm;

moving the retainer stud by the robot arm of the automation equipment to a location remote from where the backing wafer was removed;

pressing the retainer stud and seal having contact adhesive and uncured adhesive onto the panel to compress the seal, causing the contact adhesive and uncured adhesive to contact the panel, and temporarily adhering the retainer stud to the panel by the contact adhesive on the seal; and heating the retainer stud and the panel in an automobile paint drying oven to cure the uncured adhesive and bonding the retainer stud to the panel.

* * * * *